United States Patent
Chang et al.

(10) Patent No.: US 11,600,058 B2
(45) Date of Patent: Mar. 7, 2023

(54) METHODS AND SYSTEMS FOR LEARNING-BASED IMAGE EDGE ENHANCEMENT OF SAMPLE TUBE TOP CIRCLES

(71) Applicant: Siemens Healthcare Diagnostics Inc., Tarrytown, NY (US)

(72) Inventors: Yao-Jen Chang, Princeton, NJ (US); Stefan Kluckner, Berlin (DE); Benjamin S. Pollack, Jersey City, NJ (US); Terrence Chen, Princeton, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 118 days.

(21) Appl. No.: 16/630,274

(22) PCT Filed: Jun. 25, 2018

(86) PCT No.: PCT/US2018/039278
§ 371 (c)(1),
(2) Date: Jan. 10, 2020

(87) PCT Pub. No.: WO2019/013960
PCT Pub. Date: Jan. 17, 2019

(65) Prior Publication Data
US 2020/0167591 A1    May 28, 2020

Related U.S. Application Data

(60) Provisional application No. 62/531,121, filed on Jul. 11, 2017.

(51) Int. Cl.
*G06V 10/44* (2022.01)
*G06K 9/62* (2022.01)
(Continued)

(52) U.S. Cl.
CPC ......... *G06V 10/454* (2022.01); *G06K 9/6257* (2013.01); *G06N 3/04* (2013.01); *G06N 3/08* (2013.01)

(58) Field of Classification Search
CPC .............. G06K 9/4628; G06K 9/6257; G06K 2209/19; G06N 3/04; G06N 3/08;
(Continued)

(56) References Cited

U.S. PATENT DOCUMENTS 9,258,550 B1 * 2/2016 Sieracki ................ G06V 20/66
2003/0235327 A1 * 12/2003 Srinivasa ............ G06V 10/255
382/104

(Continued)

FOREIGN PATENT DOCUMENTS

WO    2015/191702 A1    12/2015
WO    2016/133924 A1    8/2016
(Continued)

OTHER PUBLICATIONS

PCT International Search Report and Written Opinion dated Sep. 17, 2018 (9 Pages).
(Continued)

*Primary Examiner* — John W Lee

(57) ABSTRACT

Methods for image-based detection of the tops of sample tubes used in an automated diagnostic analysis system may be based on a convolutional neural network to pre-process images of the sample tube tops to intensify the tube top circle edges while suppressing the edge response from other objects that may appear in the image. Edge maps generated by the methods may be used for various image-based sample tube analyses, categorizations, and/or characterizations of the sample tubes to control a robot in relationship to the
(Continued)

sample tubes. Image processing and control apparatus configured to carry out the methods are also described, as are other aspects.

8 Claims, 12 Drawing Sheets

(51) Int. Cl.
*G06N 3/04* (2006.01)
*G06N 3/08* (2006.01)

(58) Field of Classification Search
CPC ...... G06N 3/02; G06N 3/0481; G06N 3/0454; G06T 2207/20084; G06T 2207/30164; G06T 7/181; G06T 7/13; G01N 35/026; G01N 35/00732; G01N 35/0099; B25J 9/163; B25J 9/161; B25J 9/1697; G05B 2219/40499; G05B 2219/45063
See application file for complete search history.

(56) References Cited

U.S. PATENT DOCUMENTS

| | | | |
|---|---|---|---|
| 2004/0076999 A1* | 4/2004 | Faeldt | G06T 7/20 435/6.1 |
| 2015/0139485 A1* | 5/2015 | Bourdev | G06K 9/6292 382/103 |
| 2016/0140408 A1* | 5/2016 | Shen | G06N 3/084 382/157 |
| 2016/0267111 A1* | 9/2016 | Shoaib | G06F 16/283 |
| 2017/0124704 A1* | 5/2017 | Wu | G05B 21/00 |

FOREIGN PATENT DOCUMENTS

| | | |
|---|---|---|
| WO | 2017/036921 A1 | 3/2017 |
| WO | 2017/106645 A1 | 6/2017 |

OTHER PUBLICATIONS

A. Krizhevsky, I. Sutskever, and G.E. Hinton, "Imagenet classification with deep convolutional neural networks," Advances in neural information processing systems, 2012.

J. Long, E. Shelhamer, and T. Darrell, "Fully convolutional networks for semantic segmentation," Proceedings of the IEEE Conference on Computer Vision and Pattern Recognition, 2015.

J. Canny, "A Computational Approach to Edge Detection," IEEE Trans. Pattern Analysis and Machine Intelligence, vol. 8, pp. 679-698, 1986.

A.F. Frangi et al. "Multiple vessel enhancement filtering," International Conference on Medical Image Computing and Computer-Assisted Intervention, 1998.

Suzuki, Kenji et al: "Neutral Edge Enhancer for Supervised Edge Enhancement from Noisy Images"; IEEE Transactions on Pattern Analysis and Machine Intelligence; vol. 25, No. 12, Year: Dec. 2003, pp. 1582-1596, XP011103926.

* cited by examiner

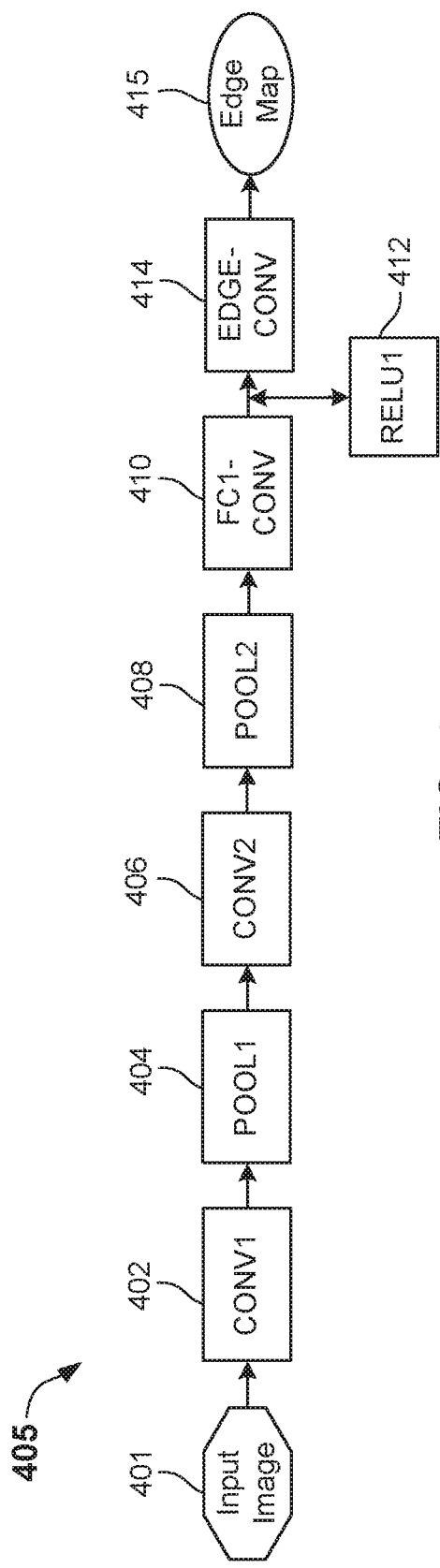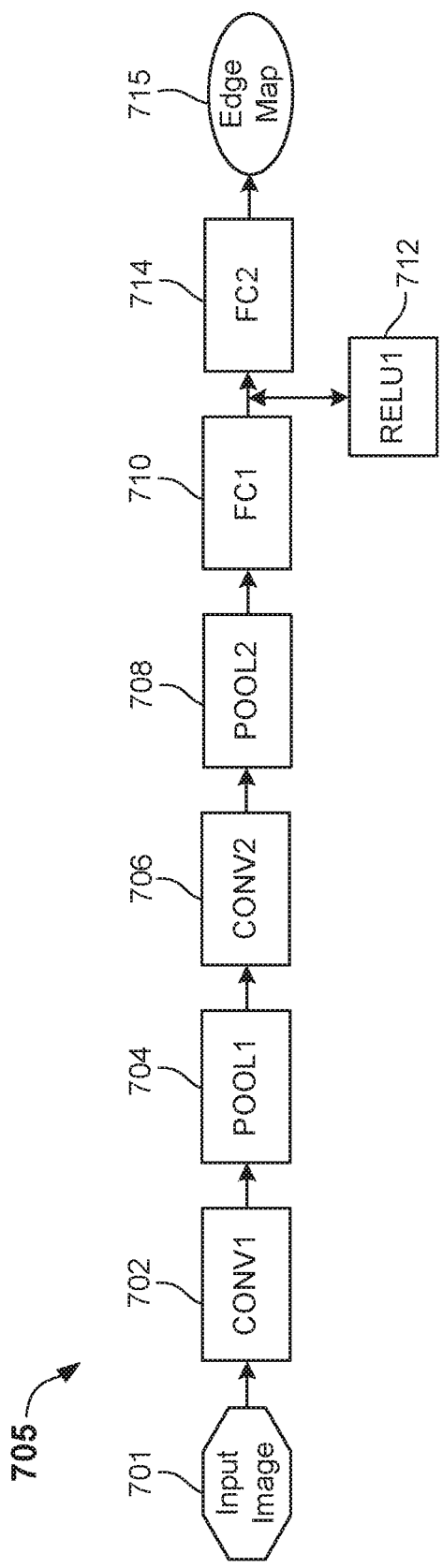

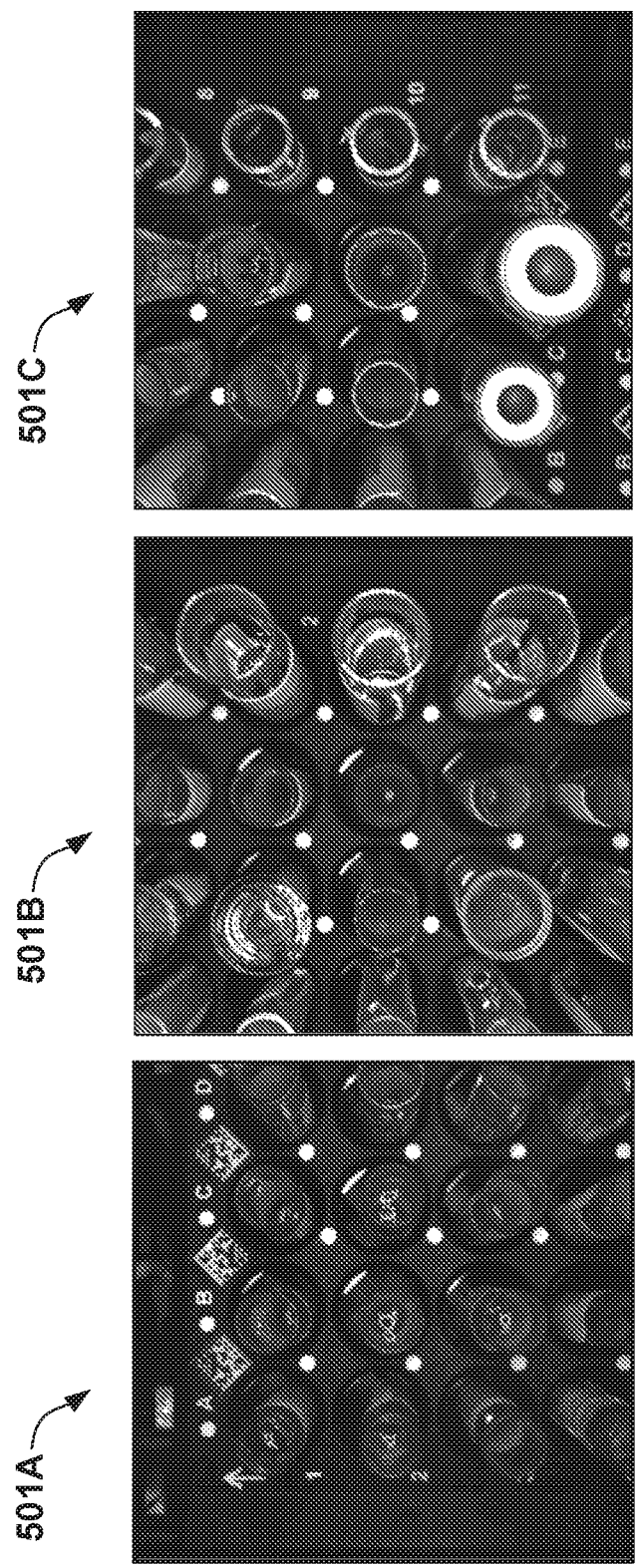

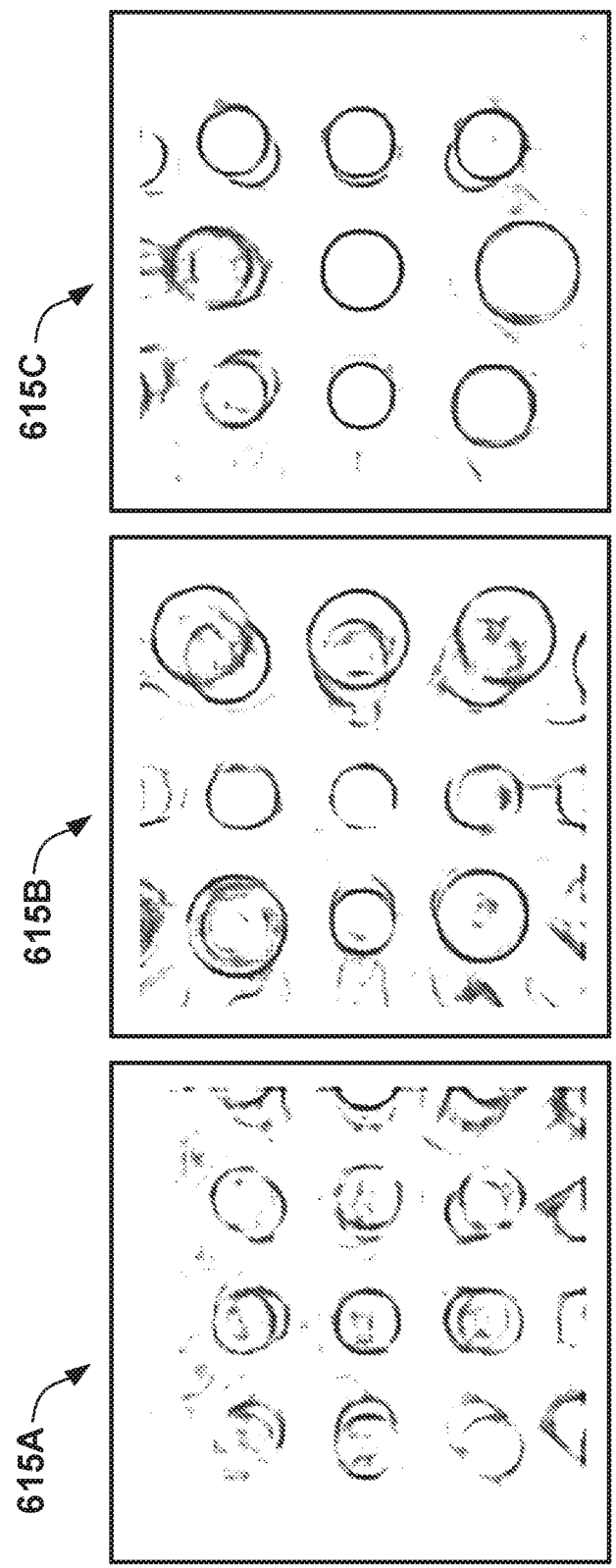

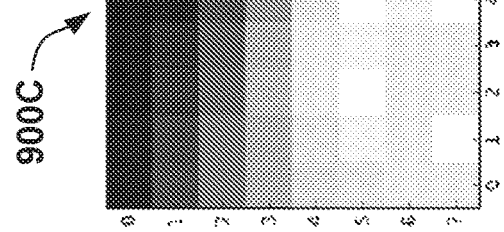
FIG. 9C
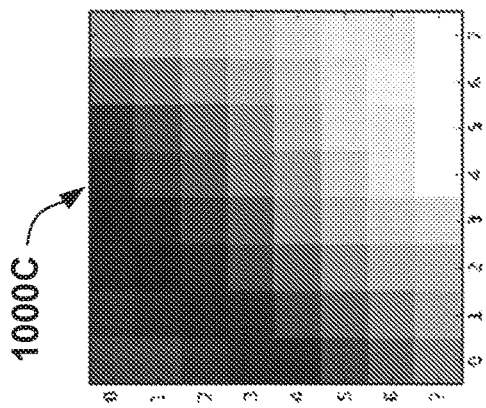
FIG. 10C
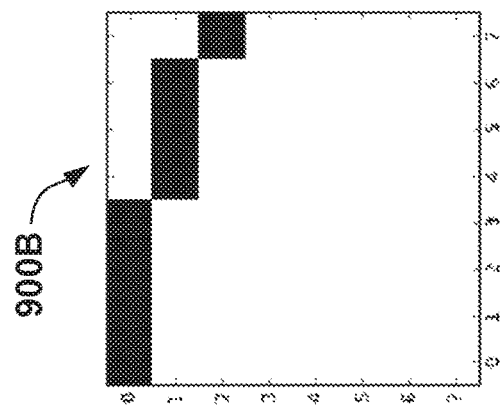
FIG. 9B
FIG. 10B
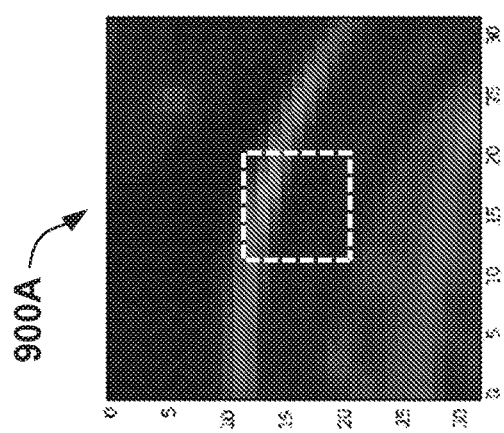
FIG. 9A
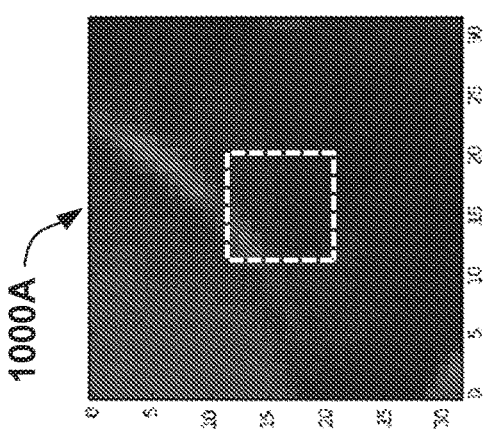
FIG. 10A

METHODS AND SYSTEMS FOR LEARNING-BASED IMAGE EDGE ENHANCEMENT OF SAMPLE TUBE TOP CIRCLES

CROSS-REFERENCE TO RELATED APPLICATIONS

This application claims priority to U.S. provisional application Ser. No. 62/531,121 filed on Jul. 11, 2017, the contents of which is incorporated herein by reference in its entirety.

FIELD

This disclosure relates to methods and systems of processing images of tops of sample tubes used in an automated diagnostic analysis system.

BACKGROUND

In vitro diagnostics allows laboratories to assist in the diagnosis of disease based on assays and/or chemical analysis performed on patient fluid samples. In vitro diagnostics includes various types of analytical tests and assays related to patient diagnosis and therapy that can be performed by analysis of a liquid sample taken from a patient's bodily fluids. These assays are typically conducted in automated analyzers of automated diagnostic analysis systems into which tubes or vials containing patient samples have been loaded. Because of the variety of assays and analyses that may be needed, and the volume of testing necessary to operate such laboratories, multiple automated analyzers are often included in an automated diagnostic analysis system.

Numerous patient samples may be transported from various doctors' offices to a laboratory having an automated diagnostic analysis system. The samples may be initially stored at one location, placed into one or more automated analyzers, and/or subsequently stored at another location prior to additional testing. Storage and transport between automated analyzers and storage locations may be done using trays. A tray is typically an array of several patient samples stored in test tubes, vials, or the like (hereinafter collectively referred to as "sample tubes"). These trays may be stackable and may facilitate easy carrying of multiple samples from one part of a laboratory to another. In some automated diagnostic analysis systems, an analyzer can accept a tray of patient samples and handle the samples accordingly, while some analyzers may require the samples to be removed from a tray by an operator and placed into carriers before further handling. In other embodiments, a robot including an end effector may remove the sample tubes from the tray and transport them to a carrier or to an automated analyzer.

To facilitate handling and processing of numerous sample tubes in an automated diagnostic analysis system, existing Image-based tube top detection methods and systems may be used to capture images of the tops of the sample tubes in order to categorize and/or characterize each sample tube (e.g., tube height, diameter, and center offset from a tube tray slot). However, some existing image-based detection methods and systems may erroneously detect and provide a stronger edge response to other objects that may appear in an image rather than a tube top. For example, the other objects may include, e.g., sample tube barcode tags, tube tray slot circles, and/or tube tray metal springs inside the tube tray slots. This may adversely affect sample tube handling and processing in an automated diagnostic analysis system. Accordingly, there is a need for improved image-based detection methods and systems of processing images of tops of sample tubes used in automated diagnostic analysis systems.

SUMMARY

According to a first embodiment, an image processing and control apparatus is provided. The image processing and control apparatus includes image capture apparatus configured to capture an image of one or more tops of one or more respective sample tubes, a robot configured to move one or more respective sample tubes, and a system controller comprising a processor and a memory, the system controller configured via programming instructions stored in the memory to process the image of the one or more tops of the one or more respective sample tubes by applying the image to a convolutional neural network to intensify sample tube top edges appearing in the image, suppress edge responses from other objects appearing in the image, generate an edge map of the image of the one or more tops of the one or more respective sample tubes, and control the robot to move one or more sample tubes based on the generated edge map.

According to another embodiment, a non-transitory computer-readable medium including computer instructions of a fully convolutional network and parameters thereof capable of being executed in a processor and of applying the fully convolutional network and the parameters to an image of sample tube tops to generate an edge map to be stored in the non-transitory computer-readable medium and to be accessible to a controller to control a robot based on the edge map is provided. The fully convolutional network includes one or more convolution layers and one or more max-pooling layers followed by first and second fully-connected convolutional layers.

According to another embodiment, a method of processing an image of sample tube tops and controlling a robot based thereon is provided. The method includes receiving an input image of one or more tops of one or more respective sample tubes, applying to the input image a fully convolutional network having one or more convolution layers and one or more max-pooling layers followed by first and second fully-connected convolutional layers, generating an edge map in response to the applying, determining sample tube categories or characteristics based on the generated edge map, and controlling a robot based on the determined sample tube categories or characteristics.

Still other aspects, features, and advantages of this disclosure may be readily apparent from the following detailed description by illustrating a number of example embodiments and implementations, including the best mode contemplated for carrying out the present invention. The present disclosure may also be capable of other and different embodiments, and its several details may be modified in various respects. Accordingly, the drawings and descriptions are to be regarded as illustrative in nature, and not as restrictive. The drawings are not necessarily drawn to scale. This disclosure is to cover all modifications, equivalents, and alternatives falling within the scope of the claims.

BRIEF DESCRIPTION OF THE DRAWINGS

FIG. 4 illustrates a fully convolutional network configured to pre-process images of sample tube tops according to embodiments.

FIGS. 5A-5C illustrate respective images of sample tube tops according to embodiments.

FIGS. 6A-6C illustrate respective edge maps of the sample tube tops of FIGS. 5A-5C according to embodiments.

FIG. 7 illustrates a patch-based convolutional neural network according to embodiments.

FIGS. 9A, 9B, and 9C illustrate respectively an input image patch, a corresponding ground truth edge map of a central patch, and a corresponding output generated from the patch-based convolutional neural network of FIG. 6 according to embodiments.

FIGS. 10A, 10B, and 10C illustrate also respectively an input image patch, a corresponding ground truth edge map of a central patch, and a corresponding output generated from the patch-based convolutional neural network of FIG. 6 according to embodiments.

DETAILED DESCRIPTION

In an automated diagnostic analysis system, image-based sample tube top circle detection allows various sample tube features to be automatically analyzed, categorized, and characterized, such as, e.g., tube height, tube diameter, and center offset from a tube tray slot. Existing image-based tube top circle detection methods and systems may rely heavily on edge detection as the pre-processing step. However, in some cases, these existing image-based tube top circle detection methods and systems may erroneously detect and provide a stronger edge response to other objects appearing in the image rather than the actual tube top circles. The other objects may include, e.g., sample tube barcode tags, tube tray slot circles, and tube tray metal springs inside the tube tray slots. One way to improve the tube circle detection performance is to differentiate edges coming from tube top circles and edges coming from other objects in the image. Using a patch-based approach with manually annotated circles as ground truth (as described below), methods and systems in accordance with one or more embodiments include a learning-based sample tube top edge enhancement computer-implemented method that intensifies the tube top circle edges while suppressing the edge response from other objects that may appear in the image. The methods and systems in accordance with one or more embodiments may improve the robustness of sample tube top circle detection and may correctly respond to more challenging cases (i.e., images with other objects appearing therein). The methods and systems in accordance with one or more embodiments may be based on a convolutional neural network that "learns" how to turn an input image into an edge map where sample tube edges are intensified while edges of other objects are suppressed. These and other aspects and features of the embodiments of the disclosure will be described below in connection with reference to FIGS. 1A-14.

Figure 1A:
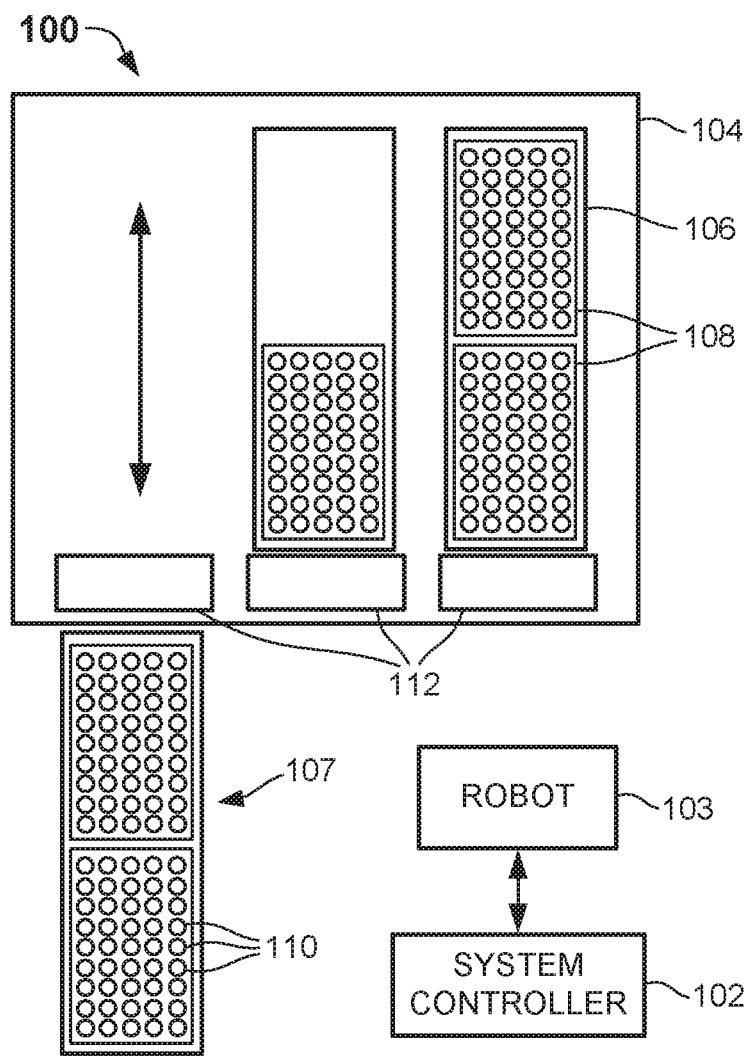
FIGS. 1A and 1B illustrate top plan and partial perspective views, respectively, of an image processing system for capturing and processing images of sample tube tops according to embodiments.
Figure 1B:
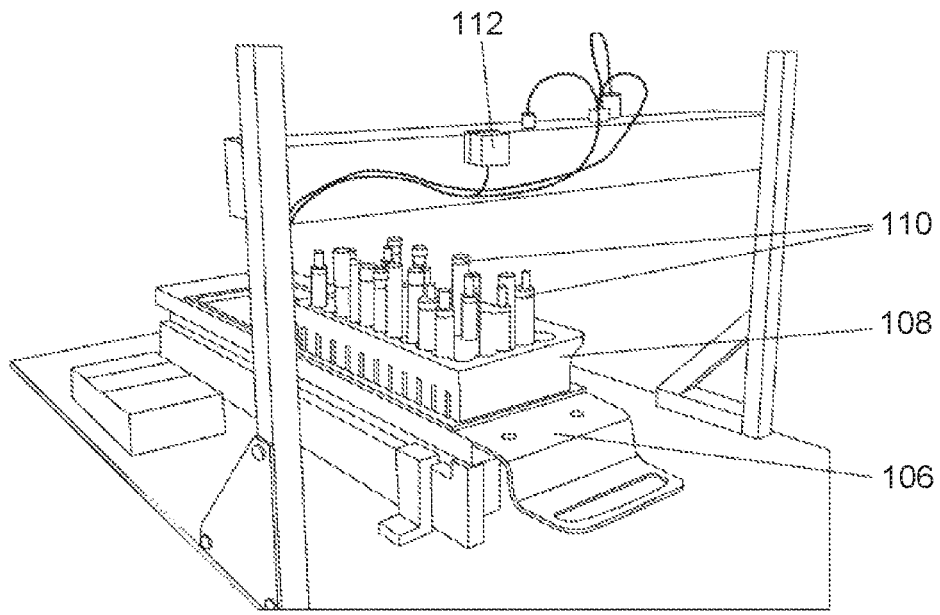

FIGS. 1A and 1B illustrate an image processing system 100 for capturing and processing images of sample tube tops for tube categorization and tube characterization in accordance with one or more embodiments. System 100 may include a system controller 102, a robot 103, a work area 104, one or more drawers 106 (only one labeled) configured to be movable from a position 107 into work area 104 where a sample handler (not shown) including the robot 103 may have access thereto, one or more tube trays 108 (only two labeled) each loaded in a drawer 106 and each configured to receive and carry a plurality of sample tubes 110 (only three labeled) that may be arranged in rows and columns therein, and image capture apparatus 112, one for each drawer 106. Note that the number of sample tubes 110 per tube tray 108, the number of tube trays 108 per drawer 106, and/or the number of drawers 106 per work area 104 may be different in other embodiments. Robot 103 may be controlled by system controller 102 (or another suitable controller) and may be configured with an end effector to grasp and move individual sample tubes 110 to and from work area 104 and an automated analyzer and/or other work area (neither shown) of system 100.

Image capture apparatus 112 may capture images of a top of a tube tray 108 and its sample tubes 110 as, in some embodiments, a tube tray 108 is moved either manually or automatically into work area 104 from position 107. The images may be processed and analyzed by system controller 102 as described further below. In some embodiments, as shown In FIG. 1B, image capture apparatus 112 may be positioned at or near a drawer 106 entrance to work area 104 and above the surface of a tube tray 108 disposed in a drawer 106 and carrying sample tubes 110. Image capture apparatus 112 may include one or more cameras (not specifically shown in FIGS. 1A and 1B) or any other suitable image capture device(s) that may be positioned, e.g., about three to six inches above the tops of sample tubes 110 to capture a high resolution image thereof. Other distances and/or positioning may be used depending on the features of the camera(s)/device(s) used and the desired perspective and image quality. In some embodiments, image capture apparatus 112 may optionally include one or more lighting sources, such as an LED (light emitting diode) flash.

Figure 2:
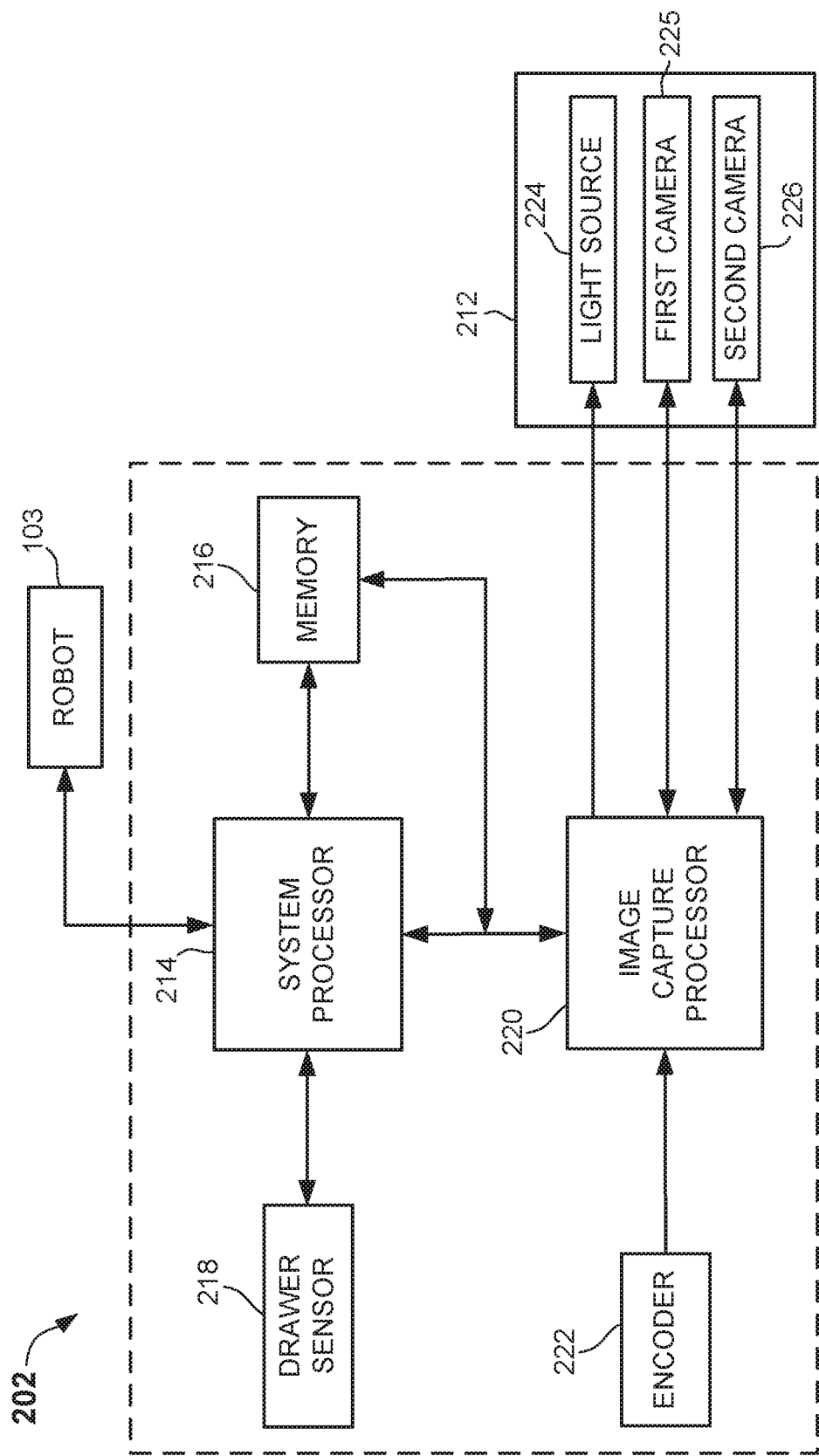
FIG. 2 illustrates a block diagram of a system controller and components of an image processing system according to embodiments.

FIG. 2 illustrates a system controller 202 configured to control the capture and processing of images of sample tube tops in accordance with one or more embodiments. System controller 202, which may be identical or substantially similar to system controller 102 of FIG. 1A, may include a system processor 214, one or more memories 216 (only one shown), one or more drawer sensors 218 (only one shown), an image capture processor 220, and an encoder 222. Note that other conventional components, such as, e.g., input/output devices, network interfaces, etc., are not shown for clarity. System controller 202 may be coupled to an image capture apparatus 212, which may be identical or substantially similar to image capture apparatus 112 of FIGS. 1A and 1B.

In some embodiments, image capture apparatus 212 may include a light source 224, a first camera 225 (e.g., a left-positioned camera with respect to a center of a tube tray 108), and a second camera 226 (e.g., a right-positioned camera with respect to a center of a tube tray 108). Other numbers of cameras or other image capture devices may be used depending on the size of drawers 106 and tube trays 108 and/or the desired image quality and image perspective. Image capture processor 220 may be configured (via programming instructions) to control the operation of light source 224, first camera 225, and second camera 226 including, e.g., providing power to some or all, and may receive images taken by first camera 225 and second camera 226. In some embodiments, image capture processor 220 may be a part of image capture apparatus 212 instead of system controller 202. In other embodiments, system processor 214 may be coupled to image capture apparatus 212 and may perform the functions of image capture processor 220, which may be omitted from system controller 202.

Encoder 222, which may be a quadrature encoder in some embodiments, may be used to determine when a row of a tube tray 108 is moved into a centered or substantially centered position beneath first camera 225 and/or second camera 226. Encoder 222 may transmit a control signal (e.g., a pulse) to image capture processor 220 upon detection of a tube tray 108 movement corresponding to a new row of sample tubes 110 moving into a centered or substantially centered position beneath first camera 225 and/or second camera 226. Upon receipt of the control signal, image capture processor 220 may signal first camera 225 and/or second camera 226 to take an image of the new row of sample tubes 110.

System processor 214 may be configured (via programming instructions) to process the images taken by first camera 225 and/or second camera 226 as described further below in connection with FIG. 3. Upon detection of the closing of a drawer 106 containing the tube tray 108 whose sample tubes 110 have been imaged, image capture processor 220 may transmit the images to system processor 214 for processing. The transmitted images may also be stored in memory 216. In addition to processing the images, system processor 214 may also be configured to control the movement of tube trays 108 and sample tubes 110 between storage locations, such as, e.g., work area 104, and one or more automated analyzers (not shown). The image processing and subsequent analysis performed by system processor 214 to determine various sample tube 110 characteristics may advantageously facilitate the handling, transfer, and processing of sample tubes 110 by robot 103.

Memory 216 may be coupled to system processor 214 and coupled to receive and store images of tops of sample tubes 110 from, e.g., image capture processor 220. Memory 216 may be any type of non-transitory computer readable medium, such as, e.g., random access memory (RAM), hard, magnetic, or optical disk, flash memory, and/or combinations thereof. Memory 216 may be configured to receive and store programs (i.e., computer-executable programming instructions) executable by system processor 214 and/or image capture processor 220. Note that system processor 214 and/or image capture processor 220 may also be configured to execute programming instructions embodied as firmware.

Drawer sensor 218 may be coupled to system processor 214 and may be configured to indicate when a drawer 106 is fully closed in work area 104 and/or when a drawer 106 is fully opened (e.g., position 107 shown in FIG. 1A). In some embodiments, upon drawer sensor 218 sensing that a corresponding drawer 106 has moved into a fully closed position, drawer sensor 218 may respond by signaling system processor 214 to begin image processing of the captured images stored in memory 216.

Figure 3:
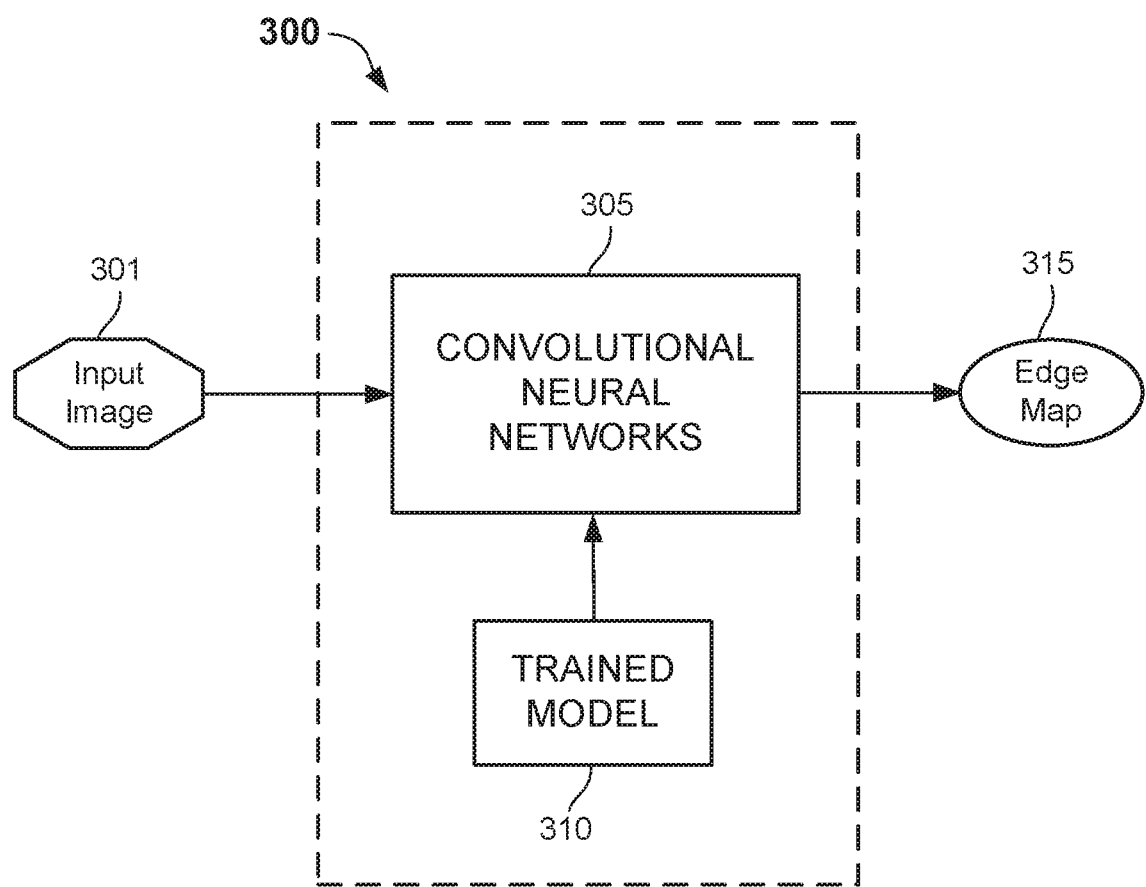
FIG. 3 illustrates an image processing module that converts an input image into an edge map according to embodiments.

FIG. 3 illustrates an image processing module 300 included in image processing methods and systems in accordance with one or more embodiments. Image processing module 300 may be configured to process an input image 301, which may be an image of sample tube tops, and generate an edge map 315 of those sample tube tops suitable for input to tube circle detection and localization methods to enable tube geometry characterization and tube type classification. The image processing module 300 may use a machine-learning based method such as a convolutional neural network 305 with a trained model 310 to process input image 301 and generate the corresponding edge map 315. Edge map 315 may be stored in a non-transitory computer-readable storage medium, such as, e.g., memory 216 of FIG. 2. The trained model 310 includes the network parameters used to process images in the convolutional neural network 305 and may include kernel weights, kernel sizes, stride values, and padding values, each described in more detail below.

FIG. 4 illustrates an example of a convolutional neural network in accordance with one or more embodiments. The convolutional neural network may be a fully convolutional network 405 and may be derived from a patch-based convolutional neural network by using the training procedure described below in connection with FIGS. 7-10C. The network configuration of the fully convolutional network 405 and the trained model 310 may be stored in, e.g., memory 216, and may be part of a method performed by image processing system 100 and/or system controller 202.

The fully convolutional network 405 may include a plurality of layers including a first convolutional layer CONV1 402, a first max-pooling layer POOL1 404, a second convolutional layer CONV2 406, a second max-pooling layer POOL2 408, a fully-connected convolutional layer FC1-CONV 410, a nonlinear layer RELU1 412, and an edge convolutional layer EDGE-CONV 414. Note that the number of convolutional and max-pooling layers may be different in other embodiments. The input to the first convolutional layer CONV1 402 may be an input image 401, which may be an image of sample tube tops captured by, e.g., image capture apparatus 112 or 212. Input image 401 may be, e.g., any one of sample tube top images 501A, 501B, and 501C as shown respectively in FIGS. 5A-5C. Input image 401 may be an arbitrarily-sized image, such as, e.g., 32 pixels×32 pixels, or, e.g., 480 pixels×480 pixels. Input image 401 may be received in a suitable file format, such as, e.g., JPEG, TIFF, or the like and, in some embodiments, may be color, grayscale, or black-and-white (monochrome). Input image 401 may be received by the fully convolutional network 405 as an array of pixel values.

The first convolutional layer CONV1 402 may receive an original input image 401 as input and may generate one or more output activation maps (i.e., representations of input image 401). The first convolutional layer CONV1 402 may be considered a low level feature detector configured to detect, e.g., simple edges. First convolutional layer CONV1 402 may generate one or more output activation maps based on a kernel size of 5, a stride of 1, and a padding of 0. The kernel, having its parameters stored in the trained model 310, may include an array of numbers (known as "weights") representing a pixel structure configured to identify edges or curves of sample tube top circles in input image 401. The kernel size may be thought of as the size of a filter applied to the array of pixel values of input image 401. That is, the kernel size indicates the portion of the input image (known as the "receptive field") in which the pixel values thereof are mathematically operated on (i.e., "filtered") with the kernel's array of numbers. The mathematical operation may include multiplying a pixel value of the input image with a corresponding number in the kernel and then adding all the multiplied values together to arrive at a total. The total may indicate the presence in that receptive field of a desired feature (e.g., a portion of an edge or curve of a sample tube top). In this first convolutional layer, the kernel size is 5, meaning a 5 pixel×5 pixel sized filter is applied to input image 401. The stride may be the number of pixels by which the kernel shifts in position to filter a next receptive field. The kernel continues to shift ("convolve") around the input image by the stride until the entire input image has been filtered. Padding may refer to the number of rows and columns of zero pixel values to be added around the border of the output activation maps. In this first convolutional layer, the padding is 0, meaning no rows and columns of zero pixel values are added to the border of the output activation maps. The output activation maps may thus include calculated pixel numbers representing pixel intensities in the input image based on the kernel size, weights, and original pixel values of the input image.

The one or more activation maps generated by the first convolutional layer CONV1 402 may be applied to a first max-pooling layer POOL1 404 having a kernel size of 2, a stride of 2, and a padding of 0. The first max-pooling layer POOL1 404 may generate output activation maps having maximum pixel values appearing in the one or more activation maps received from the first convolutional layer CONV1 402. That is, applying the kernel size of 2 to the input activation maps, the maximum value of the calculated pixel values in each receptive field is included in output activation maps generated by the first max-pooling layer POOL1 404.

The output activation maps generated by the first max-pooling layer POOL1 404 may be input to a second convolutional layer CONV2 406. Second convolutional layer CONV2 406 may be configured to detect, e.g., more circular features (e.g., semicircles) than the first convolutional layer CONV1 402. Second convolutional layer CONV2 406 may generate output activation maps based on a kernel size of 5, a stride of 1, and a padding of 0 applied to the input activation maps received from the first max-pooling layer POOL1 404.

The activation maps generated by the second convolutional layer CONV2 406 may be applied to a second max-pooling layer POOL2 408 having a kernel size of 2, a stride of 2, and a padding of 0. The second max-pooling layer POOL2 408 may generate output activation maps having maximum pixel values appearing in the activation maps received from the second convolutional layer CONV2 406 as described above in connection with the first max-pooling layer POOL1 404.

The output activation maps from the second convolutional layer POOL2 408 may be input to a fully-connected convolutional layer FC1-CONV 410. The fully-connected convolutional layer FC1-CONV 410 is a convolutional layer converted from a fully-connected layer. The fully-connected convolutional layer FC1-CONV 410 may be configured to detect, e.g., higher level features than the previous layers. The fully-connected convolutional layer FC1-CONV 410 may generate activation maps based on a kernel size of 5, a stride of 1, and a padding of 0.

A nonlinear layer RELU1 412 (i.e., a ReLU—Rectified Linear Unit) may be applied to the output activation map generated by the fully-connected convolutional layer FC1-CONV 410. The nonlinear layer RELU1 412 may apply a non-linear function, such as, e.g., the function $f(x)=\max(0, x)$, to all values in the activation map received from FC1-CONV 410. This may result in, e.g., all negative activation values being assigned a value of 0.

The activation maps returned from ReLU1 may be input to an edge convolutional layer EDGE-CONV 414. Similar to the fully-connected convolutional layer FC1-CONV 410, the edge convolutional layer EDGE-CONV 414 is also a convolutional layer converted from a fully-connected convolutional layer. The edge convolutional layer EDGE-CONV 414 may generate therefrom a full frame tube circle edge map 415 based on a kernel size of 5, a stride of 1, and a padding of 0. Edge map 415 corresponds to input image 401 and may be stored in a non-transitory computer-readable storage medium, such as, e.g., memory 216 of FIG. 2.

Edge map 415 may be, e.g., any one of full-frame tube circle edge maps 615A, 615B, and 615C, as shown respectively in FIGS. 6A-6C. Edge maps 615A, 615B, and 615C correspond respectively to sample tube top images 501A, 501B, and 501C of FIGS. 5A-5C and may be stored in a non-transitory computer-readable storage medium, such as, e.g., memory 216 of FIG. 2.

Figure 8A:
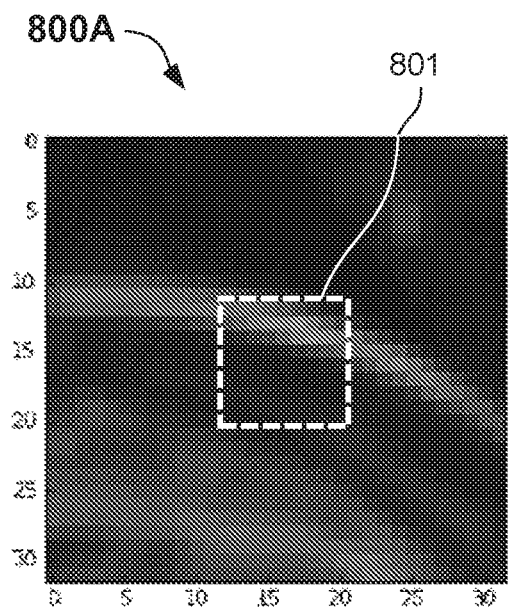
FIG. 8A illustrates an input image patch with a manually annotated central patch according to embodiments.
Figure 8B:
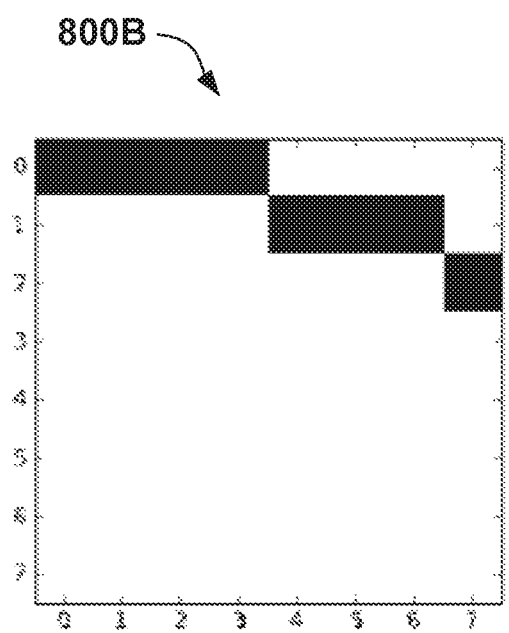
FIG. 8B illustrates a ground truth edge map for the central patch of FIG. 8A according to embodiments.

The fully convolutional network 405 may be derived from a patch-based convolutional neural network 705 as shown in FIG. 7 in accordance with one or more embodiments. The patch-based convolutional neural network 705 may include a plurality of layers including a first convolutional layer CONV1 702, a first max-pooling layer POOL1 704, a second convolutional layer CONV2 706, a second max-pooling layer POOL2 708, a first fully-connected layer FC1 710, a nonlinear layer RELU1 712, and a second fully-connected layer FC2 714. Note that the number of convolutional and max-pooling layers may be different in other embodiments. The input to the first convolutional layer CONV1 702 may be input image 701. The first convolutional layer CONV1 702, the first max-pooling layer POOL1 704, the second convolutional layer CONV2 706, the second max-pooling layer POOL2 708, and the nonlinear layer RELU1 712 may be respectively identical to the first convolutional layer CONV1 402, the first max-pooling layer POOL1 404, the second convolutional layer CONV2 406, the second max-pooling layer POOL2 408, and the nonlinear layer RELU1 412 of the fully convolutional network 405 (FIG. 4). Input image 701 may be a fixed-sized image patch 800A (which may be, e.g., 32 pixels×32 pixels), as shown in FIG. 8A. The desired output may be a central patch 801 of image patch 800A of a corresponding ground truth edge map 800B, shown in FIG. 8B. Ground truth edge map 800B may be, e.g., 8 pixels×8 pixels, derived from manual annotation. A ground truth image may be a highly accurate image against which other images (e.g., from image processing methods) are compared. The first fully-connected layer FC1 710 may have 500 nodes, while the second fully-connected layer FC2 714 may have 64 nodes. The 64 nodes of the second fully-connected layer FC2 714 may correspond to the 64 pixels (8 pixels×8 pixels) of an edge map 715 of a central patch. FIGS. 9A-9C and 10A-10C show examples of an input image patch 900A and 1000A, a ground truth edge map 900B and 1000B, and a corresponding output 900C and 1000C generated from patch-based convolutional neural network 705.

To generate the whole sample tube edge map for a whole image as an input, a fixed-sized (e.g., 32 pixels×32 pixels) window may be used to scan the image and accumulate the edge response from each pixel. However, this may be time-consuming as many unnecessary repetitive computations may be involved. To overcome this disadvantage, the fully convolutional network 405 has been derived from the patch-based convolutional neural network 705 by converting the first fully-connected layer FC1 710 to fully-connected convolutional layer FC1-CONV 410, and by converting the second fully-connected layer FC2 714 to edge convolutional layer EDGE-CONV 414, as shown in FIG. 4. In this way, any arbitrarily-sized image may be input to the fully convolutional network 405 to directly generate a corresponding edge map without the scanning window.

Figure 11:
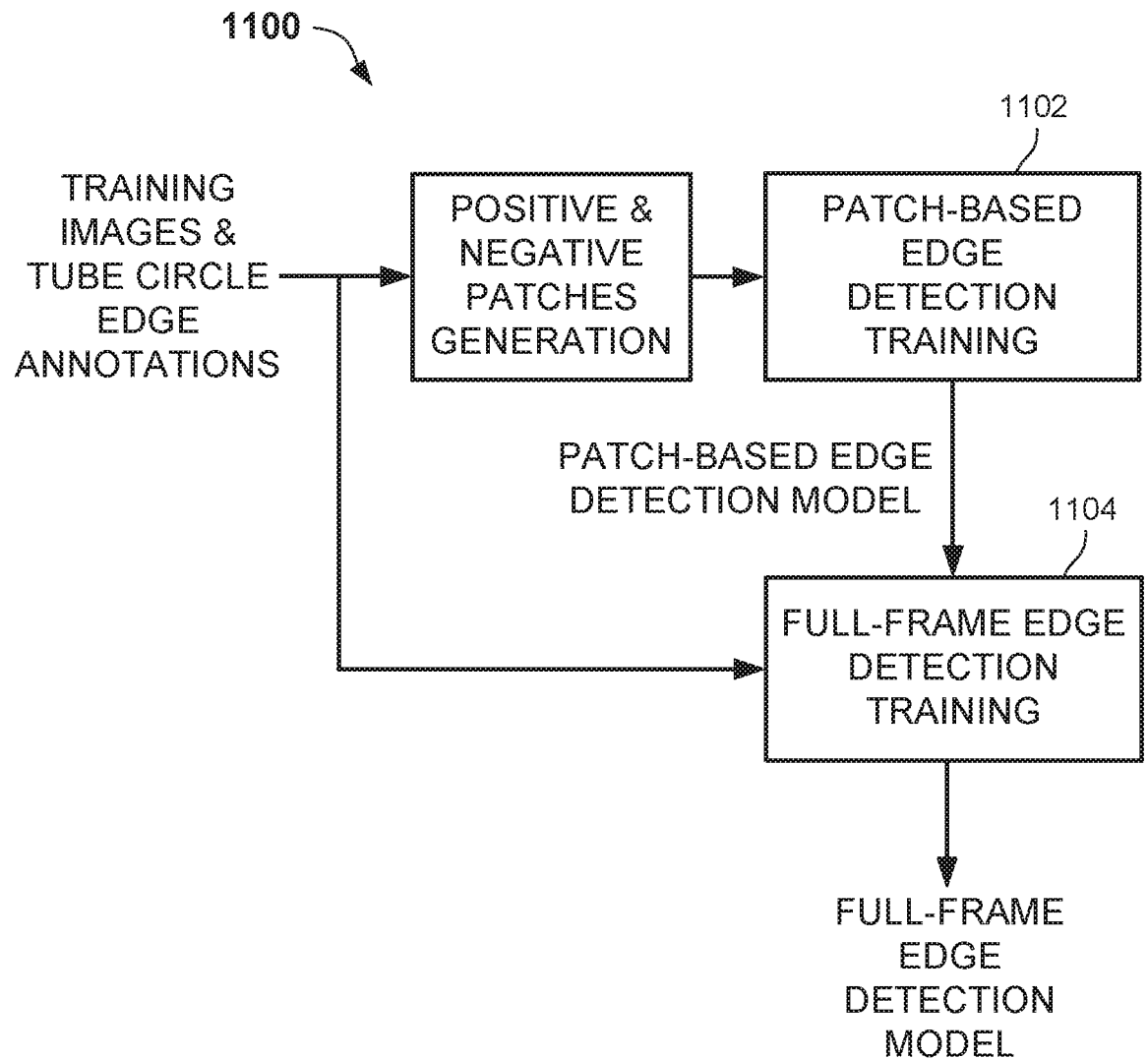
FIG. 11 illustrates a flowchart of a method of training an edge detection model with the patch-based convolutional neural network of FIG. 6 according to embodiments.

FIG. 11 illustrates a method 1100 of training that may be performed with the patch-based convolutional neural network 705. First, the tube circle edges may be manually annotated by a circle annotation tool to generate a tube circle edge image for each corresponding training image. Patches, which may be of size 32×32 pixels, are randomly extracted from each image where positive patches contains at least one edge pixel and negative patches contain no edge pixels. The generated patches are input into the patch-based convolutional neural network 705 of FIG. 7 to train the patch-based edge detection model that attempts to turn the 32×32 pixel gray level image into an 8×8 pixel edge response map that matches the ground truth edge map central patch as closely as possible. Then, the fully-connected layers of the patch-based convolutional neural network 705 and the trained patch-based model 1102 are converted into the fully-convolutional layers of the fully convolutional network 405 as described above and the fully convolutional network 405 is refined with a full-size input gray-level image such that its output matches the edge map of the whole image as closely as possible. The refined convolutional neural network 405 with the trained full-frame edge detection model 1104 (including the network parameters) can handle an arbitrary-sized image as the input and can estimate the corresponding edge response map as the output.

Figure 12:
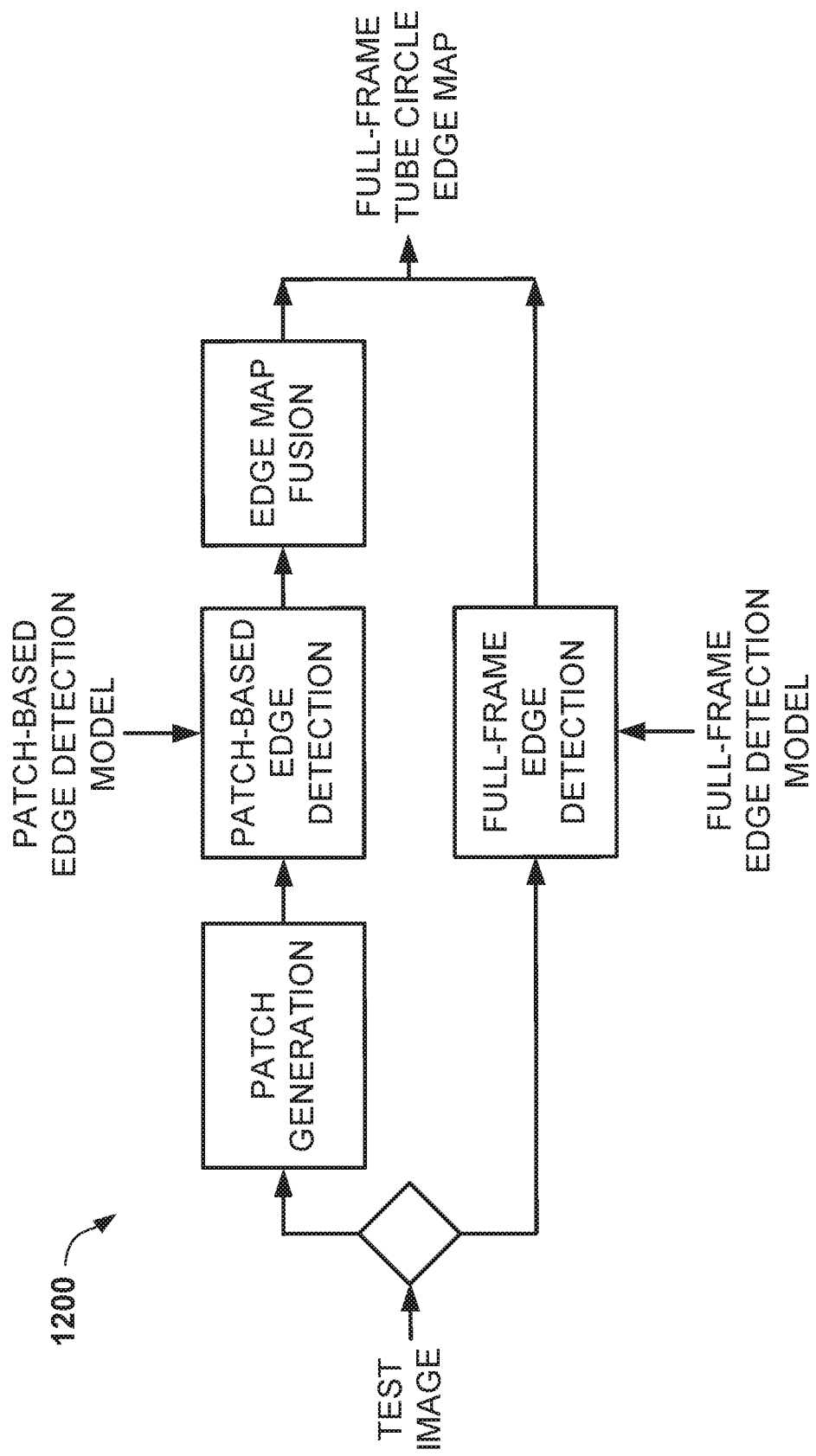
FIG. 12 illustrates a flowchart of a method of testing a trained model according to embodiments.

FIG. 12 illustrates a method 1200 of testing the trained models. For a patch-based convolutional neural network with the patch-based edge detection model, the input image may be uniformly divided into patches of size 32×32 pixels. Each patch may be input into the patch-based edge detection model to estimate the edge response of the corresponding central patch of size 8×8 pixels. Then at "Edge Map Fusion," the responses from multiple patches are fused by concatenating and normalizing the central patches to generate the estimated edge map for the whole test image. For a full-frame edge detection model, an arbitrary-sized test image can be provided as input, and the convolutional neural network 405 will directly estimate the corresponding edge response for the whole input image. Thus, using the full-frame edge detection model may be much more efficient in terms of computation.

Figure 13:
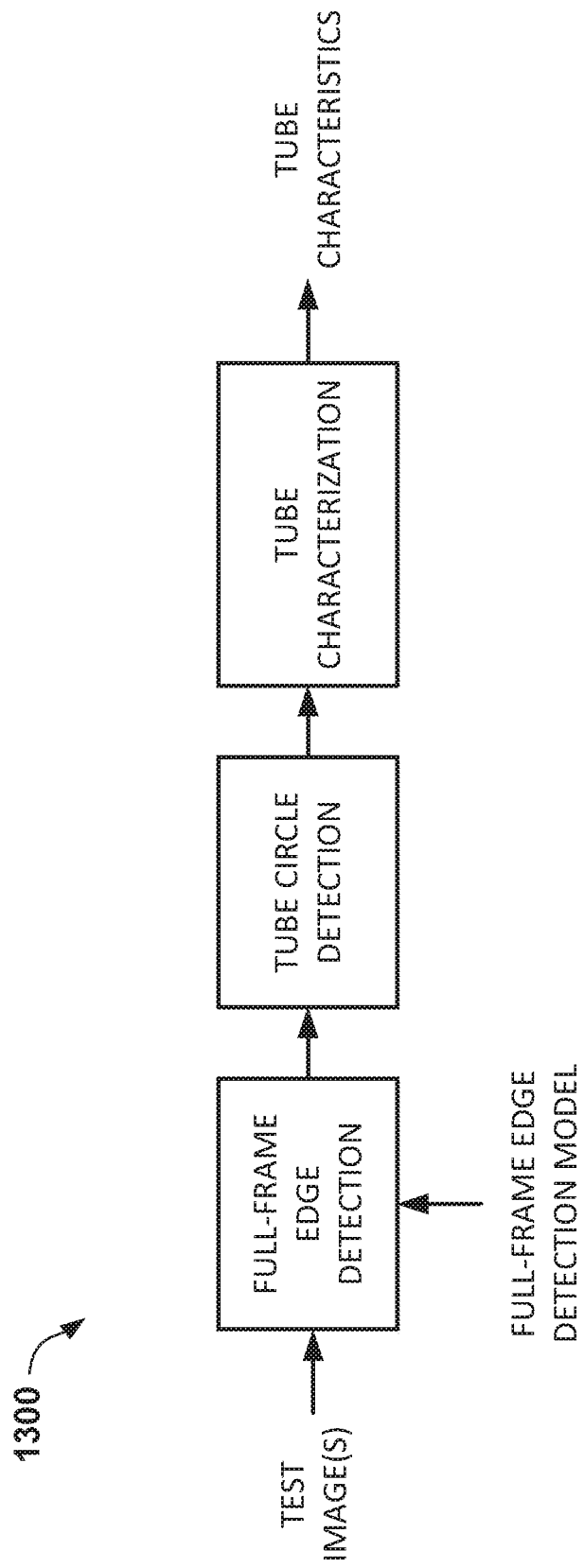
FIG. 13 illustrates a flowchart of an application of edge detection according to embodiments.

As shown in FIG. 13, an application 1300 of edge detection according to embodiments may be as a pre-processing step for higher level tasks. For example, performing full-frame tube circle detection based on the estimated edge map may be more robust as real tube circle edges are intensified and irrelevant edges are suppressed. The detected tube circle may be used for tube characterization to estimate the tube height, diameter, and center offset from the tube tray slot, which are useful properties in an automated diagnostic analysis system.

Figure 14:
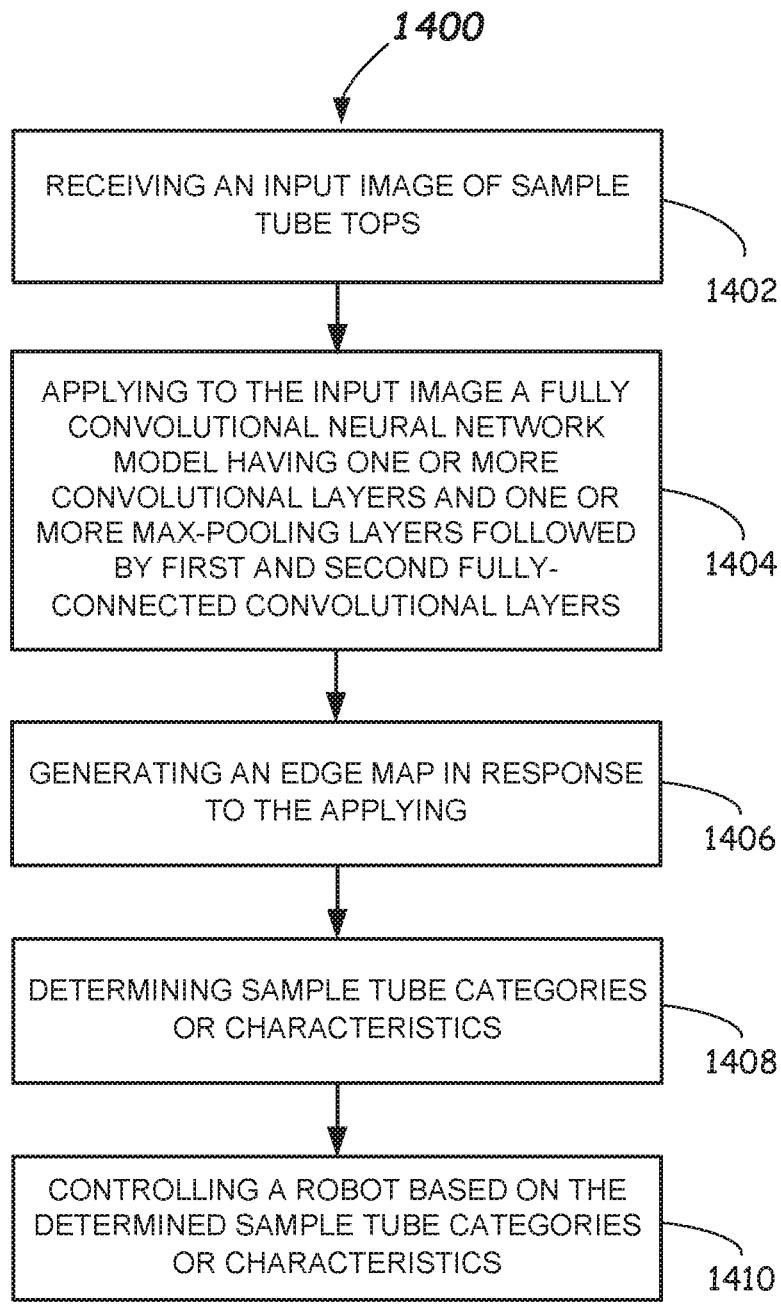
FIG. 14 illustrates a flowchart of a method of processing an image of sample tube tops according to embodiments.

FIG. 14 illustrates a method 1400 of processing an image of sample tube tops and controlling a robot based thereon according to one or more embodiments. Method 1400 may be performed by one or more controllers, such as, e.g., system controller 102 (of FIG. 1A) or 202 (of FIG. 2). At process block 1402, method 1400 may include receiving an input image of one or more tops of one or more respective sample tubes. For example, the input image may be input image 401 of FIG. 4 and/or one of sample tube top images 501A, 501B, and 501C.

At process block 1404, method 1400 may include applying to the input image a fully convolutional neural network having first and second convolution layers and first and second max-pooling layers followed by first and second fully-connected convolutional layers. For example, the convolutional neural network may be convolutional neural network 405 of FIG. 4 having first convolution layer CONV1 402, first max-pooling layer POOL1 404, second convolution layer CONV2 406, and second max-pooling layer POOL2 408 followed by fully-connected convolutional layer FC1-CONV 410 and edge convolutional layer EDGE-CONV 414.

At process block 1406, method 1400 may include generating an edge map, such as, e.g., any one of edge maps 615A, 615B, or 615C, in response to the applying at process block 1404. The generated edge map may be stored in a non-transitory computer-readable storage medium, such as, e.g., memory 216 of FIG. 2.

At process block 1408, method 1400 may include determining sample tube categories or characteristics based on the generated edge map. The sample tube categories or characteristics may include one or more of tube height, tube diameter, the shortest tube in the image, the longest (highest) tube in the image, center offset from a tube tray slot, whether a tube tray slot is empty (i.e., no sample tube therein), and/or tube type (e.g., plain tube, tube with cap, or tube with top sample cup). The sample tube categories or characteristics may be stored in a non-transitory computer-readable storage medium, such as, e.g., memory 216 of FIG. 2.

And at process block 1410, method 1400 may include controlling a robot, an end effector, one or more probes, or the like, based on the determined sample tube categories or characteristics. For example, based on determined sample tube categories or characteristics, system controller 102 of FIG. 1A (or any other suitable controller) may control the operation of robot 103 (and/or an end effector coupled to the robot) to grasp and move one of sample tubes 110. For example, the degree of opening of the end effector may be set based on the tube size. Likewise, a corresponding offset of the end effector from the center of the tube tray slot may be accomplished if the tube top is offset in the tube tray. Further, a rotational orientation of the end effector may be changed depending on tube top position and its positional relationship to other surrounding tube tops. As such, crashes between the tube tops of the sample tubes 110 and the end effector can be minimized or avoided. The placement of probes (e.g., by robot 103) within tubes similarly may be based on determined sample tube categories or characteristics.

In some embodiments, a non-transitory computer-readable medium, such as, e.g., a removable storage disk or device, may include computer instructions capable of being executed in a processor, such as, e.g., system processor 214, and of performing method 1400.

The edge maps generated by the systems and methods described herein effectively intensified the edges of sample tube circles while suppressing edges from other objects. The generated edge maps may advantageously be further used for various image-based sample tube analysis and characterization. For example, the generated edge maps may be used as the input to existing tube circle detection and localization methods, one or more of which may be stored in, e.g., memory 216 of system controller 202 of FIG. 2, to enable tube geometry characterization and tube type classification. The tube geometry characterization and tube type classification determined by the tube circle detection and localization methods may be used by a controller, such as system controller 102 or 202, to control a robot and/or an end effector, such as, e.g., robot 103 of FIG. 1A, to grasp and move sample tubes, such as, e.g., sample tubes 110 of FIG. 1A, but also to place sample tubes.

Having shown the preferred embodiments, those skilled in the art will realize many variations are possible that will still be within the scope of the claimed invention. Therefore, it is the intention to limit the invention only as indicated by the scope of the claims which follow.

What is claimed is:

1. An image processing and control apparatus, comprising:
    image capture apparatus configured to capture an image of one or more tops of one or more respective sample tubes;
    a robot configured to move the one or more respective sample tubes; and
    a system controller comprising a processor and a memory, the system controller configured via programming instructions stored in the memory to process the image of the one or more tops of the one or more respective sample tubes by applying the image to a convolutional neural network to:
        identify and intensify sample tube top edges appearing in the image;
        identify and suppress edge responses from other objects appearing in the image;
        generate an edge map of the image of the one or more tops of the one or more respective sample tubes; and
        control the robot to move one or more sample tubes based on the generated edge map;
    wherein the convolutional neural network is a patch-based convolutional network comprising a plurality of convolution layers followed by a fusion module that fuses edge responses of individual patches into one edge map representing an input image.

2. The image processing and control apparatus of claim 1, wherein the robot comprises an end effector configured to grasp and move the one or more sample tubes based on the edge map.

3. The image processing and control apparatus of claim 1, further comprising a tube tray configured to receive the one or more sample tubes therein.

4. An image processing and control apparatus, comprising:
    image capture apparatus configured to capture an image of one or more tops of one or more respective sample tubes;
    a robot configured to move the one or more respective sample tubes; and
    a system controller comprising a processor and a memory, the system controller configured via programming instructions stored in the memory to process the image of the one or more tops of the one or more respective sample tubes by applying the image to a convolutional neural network to:
        identify and intensify sample tube top edges appearing in the image;
        identify and suppress edge responses from other objects appearing in the image;
        generate an edge map of the image of the one or more tops of the one or more respective sample tubes; and
        control the robot to move one or more sample tubes based on the generated edge map; wherein:
            the convolutional neural network is a fully convolutional network comprising a plurality of convolution layers;
            the fully convolutional network comprises one or more convolution layers and one or more max-pooling layers followed by one or more fully-connected convolutional layers;
            a first convolution layer includes a kernel size of 5, a stride of 1, and a pad of 0;
            a second convolution layer includes a kernel size of 5, a stride of 1, and a pad of 0;
            a first fully-connected convolution layer includes a kernel size of 5, a stride of 1, and a pad of 0; and
            a second fully-connected convolution layer includes a kernel size of 1, a stride of 1, and a pad of 0.

5. The image processing and control apparatus of claim 1, wherein the patch-based convolutional network comprises one or more convolution layers and one or more max-pooling layers followed by one or more fully-connected layers.

6. The A non-transitory computer-readable medium comprising computer instructions of a fully convolutional network and parameters thereof capable of being executed in a processor and of applying the fully convolutional network and the parameters to an image of one or more sample tube tops to identify and intensify sample tube top edges appearing in the image and generate an edge map to be stored in the non-transitory computer-readable medium and accessible to a controller to control a robot based on the edge map, wherein the fully convolutional network comprises a first convolution layer that includes a kernel size of 5, a stride of 1, and a pad of 0, and further comprises a first max-pooling layer that includes a kernel size of 2, a stride of 2, and a pad of 0.

7. A method of processing an image of sample tube tops and controlling a robot based thereon, comprising:
    receiving an input image of one or more tops of one or more respective sample tubes;
    applying to the input image a fully convolutional network having one or more convolution layers and one or more max-pooling layers;
    identifying and intensifying sample tube top edges appearing in the image in response to the applying;
    generating an edge map in response to the applying and the intensifying;
    determining sample tube categories or characteristics based on the generated edge map; and
    controlling a robot based on the determined sample tube categories or characteristics;
    wherein a first convolution layer includes a kernel size of 5, a stride of 1, and a pad of 0.

8. A method of processing an image of sample tube tops and controlling a robot based thereon, comprising:
    receiving an input image of one or more tops of one or more respective sample tubes;
    applying to the input image a fully convolutional network having one or more convolution layers and one or more max-pooling layers;
    identifying and intensifying sample tube top edges appearing in the image in response to the applying;
    generating an edge map in response to the applying and the intensifying;
    determining sample tube categories or characteristics based on the generated edge map; and controlling a robot based on the determined sample tube categories or characteristics;
wherein a first max-pooling layer includes a kernel size of 2, a stride of 2, and a pad of 0.

* * * * *